United States Patent
Felsheim (10) Patent No.: US 8,150,814 B2
(45) Date of Patent: Apr. 3, 2012

(54) SYSTEM AND METHOD OF DATA CLEANSING USING RULE BASED FORMATTING

(75) Inventor: Steven E. Felsheim, LaCrosse, WI (US)

(73) Assignee: Business Objects Software Ltd., Dublin (IE)

(*) Notice: Subject to any disclaimer, the term of this patent is extended or adjusted under 35 U.S.C. 154(b) by 437 days.

(21) Appl. No.: 12/419,811

(22) Filed: Apr. 7, 2009

(65) Prior Publication Data

US 2010/0257145 A1  Oct. 7, 2010

(51) Int. Cl.
G06F 7/00 (2006.01)
(52) U.S. Cl. .......... 707/692; 707/693; 707/602
(58) Field of Classification Search ........... 707/999.2, 707/602, 692, 693
See application file for complete search history.

(56) References Cited

U.S. PATENT DOCUMENTS

| | | | | |
|---|---|---|---|---|
| 5,410,475 | A * | 4/1995 | Lu et al. ............... | 704/1 |
| 5,524,227 | A * | 6/1996 | Cuthbertson et al. ........ | 711/202 |
| 5,572,206 | A * | 11/1996 | Miller et al. .............. | 341/51 |
| 5,895,463 | A * | 4/1999 | Dowling et al. ............. | 1/1 |
| 5,970,490 | A * | 10/1999 | Morgenstern .............. | 1/1 |
| 6,021,407 | A * | 2/2000 | Meck et al. ............... | 1/1 |
| 6,151,608 | A * | 11/2000 | Abrams .................. | 707/679 |
| 6,513,002 | B1 * | 1/2003 | Gillam .................... | 704/9 |
| 6,523,172 | B1 * | 2/2003 | Martinez-Guerra et al. | 717/143 |
| 6,542,901 | B1 * | 4/2003 | Devine et al. .............. | 1/1 |
| 7,058,699 | B1 * | 6/2006 | Chiou et al. ............... | 709/219 |
| 7,093,231 | B2 * | 8/2006 | Nuss ..................... | 717/114 |
| 7,698,127 | B2 * | 4/2010 | Trower et al. .............. | 704/9 |
| 7,814,045 | B2 * | 10/2010 | Hermann et al. ............ | 707/600 |
| 2002/0055932 | A1 * | 5/2002 | Wheeler et al. ............ | 707/104.1 |
| 2002/0073313 | A1 * | 6/2002 | Brown et al. .............. | 713/165 |
| 2002/0198897 | A1 * | 12/2002 | Geuss et al. ............... | 707/200 |
| 2004/0024897 | A1 * | 2/2004 | Ladd et al. ................ | 709/231 |
| 2004/0123101 | A1 * | 6/2004 | Rineer et al. .............. | 713/161 |
| 2004/0177062 | A1 * | 9/2004 | Urquhart et al. ............ | 707/3 |
| 2004/0196740 | A1 * | 10/2004 | Sachedina ................ | 368/46 |
| 2005/0131854 | A1 * | 6/2005 | Slupesky et al. ............ | 707/1 |
| 2006/0085389 | A1 * | 4/2006 | Flanagan et al. ............ | 707/2 |
| 2006/0236224 | A1 * | 10/2006 | Kuznetsov et al. .......... | 715/513 |
| 2006/0271851 | A1 * | 11/2006 | Racovolis et al. ........... | 715/530 |
| 2007/0150260 | A1 * | 6/2007 | Lee et al. ................ | 704/2 |
| 2007/0174760 | A1 * | 7/2007 | Chamberlain et al. ....... | 715/504 |
| 2008/0040094 | A1 * | 2/2008 | Wolgemuth et al. ......... | 704/2 |
| 2008/0040135 | A1 * | 2/2008 | VanLangen et al. ......... | 705/1 |
| 2008/0281580 | A1 * | 11/2008 | Zabokritski ............... | 704/9 |
| 2009/0187601 | A1 * | 7/2009 | Sengupta ................. | 707/200 |
| 2009/0248694 | A1 * | 10/2009 | Martinez et al. ............ | 707/10 |
| 2010/0082706 | A1 * | 4/2010 | Lim ..................... | 707/809 |
| 2010/0125828 | A1 * | 5/2010 | Vasista .................. | 717/109 |
| 2010/0131584 | A1 * | 5/2010 | Johnson ................. | 709/203 |
| 2010/0169361 | A1 * | 7/2010 | Chen et al. ............... | 707/769 |
| 2010/0241698 | A1 * | 9/2010 | Hillerbrand .............. | 709/203 |

* cited by examiner

*Primary Examiner* — Hung T Vy
*Assistant Examiner* — Phuong Thao Cao
(74) *Attorney, Agent, or Firm* — Fountainhead Law Group PC (57) ABSTRACT

In one embodiment the present invention includes a computer-implemented method for data cleansing using rule based formatting. The method includes tokenizing and parsing a first input data and a second input data. The method further includes including a first token in a first output data if a first formatting rule component in a formatting rule is a first valid index to said first tokenized input data. The method further includes including a second token in a second output data if said first formatting rule component in the formatting rule is a second valid index to said second tokenized input data. The method further includes formatting said first output data and said second output data according to the formatting rule.

19 Claims, 5 Drawing Sheets

NUMBER = any number
PUNCTUATION = any punctuation
PLANT_ID = Plant (F), Pl (F), P (F), Plnt (F), Loc (F), location (F)
PRODUCT_ID = corn (CORN), bean (BEAN), beans (BEAN), soybeans (BEAN), sweet corn (SCRN), field corn (CORN), sorghum (SRGM)
GRADE = G (Q), grade (Q), grd (Q), qual (Q), quality (Q)
GRADE_LEVEL = VG (1), VGOOD (1), G (2), GOOD (2), P (3), POOR (3), ANIMAL (4), FEED (4)

*FIG. 2A*

```
250
    crop_rule =
    # index 1
        PLANT_ID? +
    # index 2
        NUMBER* +
    # index 3
        PRODUCT_ID +
    #index 4
        GRADE +
    #index 5
        PUNCTUATION? +
    #index 6
        GRADE_LEVEL;
    action = CROP;
    CROP = 1 : PROCESSING_FACILITY : 1 :  DEFAULT "F";
    CROP = 1 : PROCESSING_FACILITY : 2 : ON * "";
    CROP = 1 : PRODUCT : 3;
    CROP = 1 : QUALITY : 4;
    CROP = 1 : QUALITY : 6;
    format = CROP : CROP : "!" + 3 + ":," + 1 + 2 + "GRADE:" + 6 + "|";
    format = CROP : PROCESSING_FACILITY : 1 + 2;
    format = CROP : QUALITY : 4 + 6;
    end_action
```
          } 252
          } 254
          } 256

*FIG. 2B*

| Input | Output |
|---|---|
| Plant 244 corn grd:feed | \|CORN:F244GRADE:4\| |
| PL26 SORGHUM G:VGOOD | \|SRGM:F26GRADE:1\| |
| 44BEANS GRADE VG | \|BEAN:F44GRADE:1\| |
| LOC 16 SWEET CORN GRD-VG | \|SCRN:F16GRADE:1\| |
| Location244 field corn qual animal | \|CORN:F244GRADE:4\| |

*FIG. 3*

```
discrete_parser_options_start;
DISCRETE_NAME_FORMAT = NAME_DESIGNATOR + <" "> +
          PRENAME + <" " +
          GIVEN_NAME1 + <" " +
          GIVEN_NAME2 + <" " +
          FAMILY_NAME1 + <" " +
          FAMILY_NAME2 + <" "> +
          MATURITY_POSTNAME + <" " +
          HONORARY_POSTNAME + <" " +
          TITLE;

DISCRETE_NAME_ON* = " ";

DISCRETE_FIRM_ON* = " ";

DISCRETE_FIRM_FORMAT = FIRM + <" "> + FIRM_LOCATION;
discrete_parser_options_end;
```

SYSTEM AND METHOD OF DATA CLEANSING USING RULE BASED FORMATTING

BACKGROUND

The present invention relates to data cleansing, and in particular, to a system and method of data cleansing using rule based formatting.

Extract, transform, and load (ETL) may be some processes that are performed as part of managing databases. A subset of desired data may be extracted from various data sources as part of the extract component. The transform component may convert the extracted data into a suitable state. Finally, the load component of ETL may include transferring the transformed data to a target data source like another database, a data mart, or a data warehouse, for example. Thus, ETL allows data that is extracted from various data sources to be converted into some desirable format and transferred to another data source.

Data cleansing may be a process that is performed in the transform component of ETL. Data cleansing may include the detection of incorrect data, which may then be corrected or removed, and the formatting of data. Moreover, the detection of data may be accomplished by tokenizing the data and parsing the data according to some predetermined rules. One technique of parsing data is to use rules (i.e., rule-based parsing). When formatting the output data, it may be desirable to control how the tokens may be ordered or what strings may delimit the tokens. Thus, it may be desirable to tokenize and parse data. However, when using a rule-based parsing technique to parse data, it may be difficult to control how the parsed components may be ordered or what strings may delimit the parsed components.

Thus, there is a need for improved data cleansing that allows control of the formatting of output data when rule-based parsing is used. The present invention solves these and other problems by providing a system and method of data cleansing using rule based formatting.

SUMMARY

Embodiments of the present invention improve data cleansing by allowing control of the formatting of output data. In one embodiment the present invention includes a computer-implemented method for data cleansing using rule based formatting. The method includes obtaining a first input data and a second input data, wherein said first input data is tokenized according to a data dictionary, wherein said second input data is tokenized according to said data dictionary. The method further includes parsing said first input data and said second input data using a predefined parsing rule. The method further includes obtaining a formatting rule, wherein said formatting rule includes one or more formatting rule components. The method further includes including a first token in a first output data if a first formatting rule component in the formatting rule is a first valid index to said first tokenized input data, wherein said first token is associated with said first valid index, and including a first string literal in said first output data if said first formatting rule component in the formatting rule is a string literal. The method further includes including a second token in a second output data if said first formatting rule component in the formatting rule is a second valid index to said second tokenized input data, wherein said second token is associated with said second valid index and including a second string literal in said second output data if said first formatting rule component in the formatting rule is the string literal. The method further includes formatting said first output data and said second output data according to the formatting rule.

The following detailed description and accompanying drawings provide a better understanding of the nature and advantages of the present invention.

DETAILED DESCRIPTION

Described herein are techniques for data cleansing using rule based formatting. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1A:
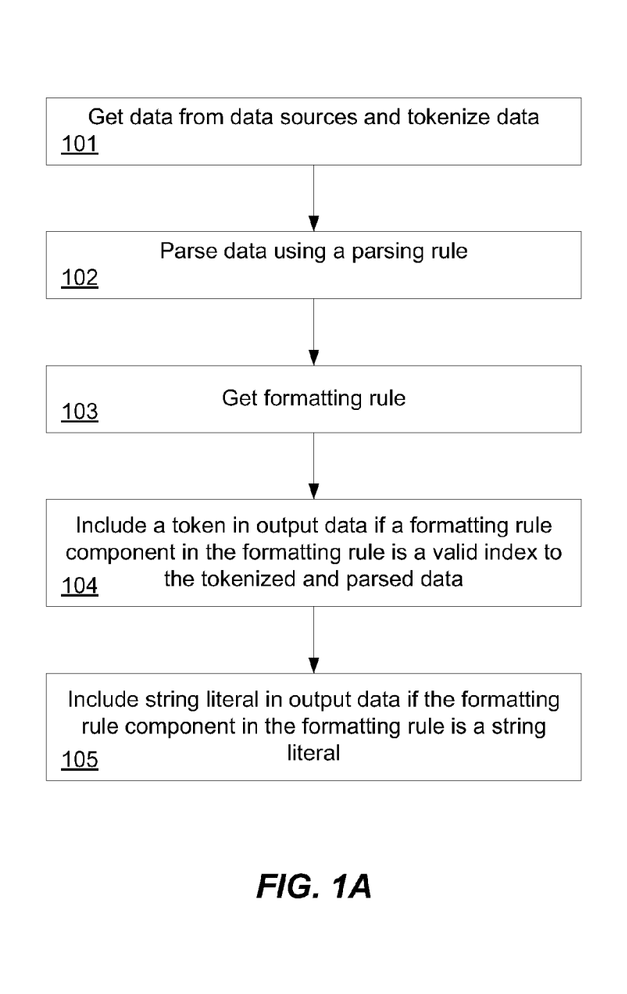
FIG. 1A illustrates a flow diagram of a method of formatting output data according to one embodiment of the present invention.

FIG. 1A illustrates a flow diagram of a method of formatting output data according to one embodiment of the present invention. The method may be implemented as one or more computer programs that are executed on a hardware system (see FIG. 5 for more details). Moreover, the method of FIG. 1A may allow input data, regardless of how it may be formatted, to be processed, and flexibly outputted in a standardized format.

In box 101, data may be obtained from a data source. Data stored in a data source may have a variety of different values and may contain various bits of information. The meaning of the data may depend on how the data may be defined by a user of the data. For example, a data source may store a piece of data related to agriculture with the value of [LOC 334 75 BEANS G-VG], which may be defined to mean that plant #334 in building 75 processed beans of a quality level of "very good." Therefore, a piece of data can take on various values according to what a user may define the data to represent. In certain embodiments, the tokenized and parsed data may be obtained from one or more data sources.

In addition, data may be tokenized in box 101. A token may be an atomic piece of the data classified by a dictionary. Tokens may also contain standard versions of the tokens text for each parsed context the token may be contained in. Standard versions of tokens and contexts may be defined by the user. Furthermore, tokens may be a result of lexical analysis of the data. Data may be tokenized by breaking the data into segments (i.e., tokens) based on a selected breaking strategy and how they are classified by a data dictionary. Classification by the data dictionary may be defined by the user. Breaking strategies may include, but are not limited to, breaking on whitespace, and breaking on punctuation, for example. Breaking strategies may be specified by the user, e.g. that the user specifies break keys. Continuing with the above example data value of [LOC 334 75 BEANS G-VG], if the breaking strategy applied is to break on whitespace, the resulting tokens may be [LOC], [334], [75], [BEANS], and [G-VG].

In box 102, data may be parsed using on or more parsing rules. A parsing rule, which may be defined by a user, may be defined to specify patterns of classifications defined in the data dictionary (e.g., the tokens) to recognize (i.e., a match). Therefore, a match may occur when one of the token's classifications satisfies the correct condition of a specified classification pattern in a parsing rule. Further, a parse may result when the tokenized data satisfies a parsing rule (i.e., the tokenized data matches all of the classification conditions of the specified pattern in the parsing rule). Thus, parsing the data (i.e., the tokens) may be a way of ensuring that the data is in an expected form, and the expected form may be based on the definition of the parsing rule (which may be defined by the user). In certain embodiments, one or more parsing rules may be included in a rule file.

The tokens of the resulting parse may be referenced by using indexes in format syntax of the rule. An index may indicate a particular component of the parsing rule indexed from left to right. Accordingly, for a given tokenized data, an index may reference a matched token that may be associated with a particular component of the parsing rule. For example, if a parsing rule is defined to be a string followed by two numbers and two more strings, the indexes for the above example data of [LOC 334 75 BEANS G-VG] may be 1 for [LOC], 2 for [334], 3 for [75], 4 for [BEANS], and 5 for [G-VG].

In some embodiments, a parsing rule may use the * operator to match one or more tokens that may match a particular token's classification. Because there may be an unknown number of matches when using the * operator, the one or more tokens that may match the particular pattern portion of a rule cannot be individually indexed. Therefore, the one or more tokens that may match the particular pattern portion of a rule may have one index. For example, if the parsing rule pattern is defined to be a string followed by one or more numbers (i.e., using the * operator) and two more strings, the indexes for the example data of [LOC 334 75 BEANS G-VG] may be 1 for [LOC], 2 for [334] and [75], 3 for [BEANS], and 4 for [G-VG]. In other embodiments of the present invention, a [ON*"some string"] operator, where some string may be a string, may be used to control what may be inserted between the one or more tokens that may match a particular classification. Continuing with the example, a [ON*" "] operator performed on the one or more tokens that match a number may result in index 2 having a value of [33475] since an empty string was specified in the operator. Accordingly, if a [ON*"X"] operator is performed instead, index 2 may have a value of [334X75]. Therefore, the [ON*"some string"] operator may be used to control what string, if any, may delimit the one or more tokens that may match a particular rule pattern portion.

In certain embodiments of the present invention, a parsing rule may use the "?" operator to indicate that a particular index may be optional. That is, a parse (i.e., a tokenized data that satisfies a parsing rule) may still occur if a particular index that may have the "?" operator applied does not have a token assigned to it. For example, a parsing rule may be an optional string (i.e., using the "?" operator) followed by two numbers and two strings. Using the above example of [LOC 334 75 BEANS G-VG], the resulting tokenized data of [LOC], [334], [75], [BEANS], and [G-VG] may be a parse of this parsing rule. Similarly, a variation of the example of [334 75 BEANS G-VG], the resulting tokenized data of [334], [75], [BEANS], and [G-VG] may also be a parse of this parsing rule because the first string may be optional.

In box 103, a formatting rule may be obtained. A formatting rule may define how matching token indexes are ordered, what string, if any, may be used to delimit the indexes, and which parts of the parse may be included in the output data. A formatting rule may include one or more formatting rule components. In one embodiment, a formatting rule component may be an index or a string literal. A string literal may be enclosed with double quotes. An example formatting rule may be "format=CROP: CROP: "|"+3+":"+1+2+"GRADE: "+6+"|";" where the first formatting rule component may be a string literal (i.e., "|"), the second formatting rule component may be an index (i.e., 3), the third formatting rule component may be a string literal (i.e., ":"), and so forth. If a formatting rule component is an index, the formatting rule component may be processed according to box 104. If a formatting rule component is a string literal, the formatting rule component may be processed according to box 105.

In box 104, a token may be included in the output data if the formatting rule component is a valid index to the tokenized data. An index to the tokenized data may be a valid index if the index is specified in the parsing rule. For example, a parsing rule that may be defined to be 5 consecutive strings may have 5 valid indexes (e.g., 1-5). In this case, an index of 6 is not a valid index, and, thus, may not be included in the output data, because the parsing rule is defined to match five consecutive strings (i.e., tokens). (Further details of box 104 are provided below with reference to FIG. 1B.)

In box 105, a string literal may be included in the output data if the formatting rule component is a string literal. As previously mentioned above, a string literal may be enclosed with double quotes.

Figure 1B:
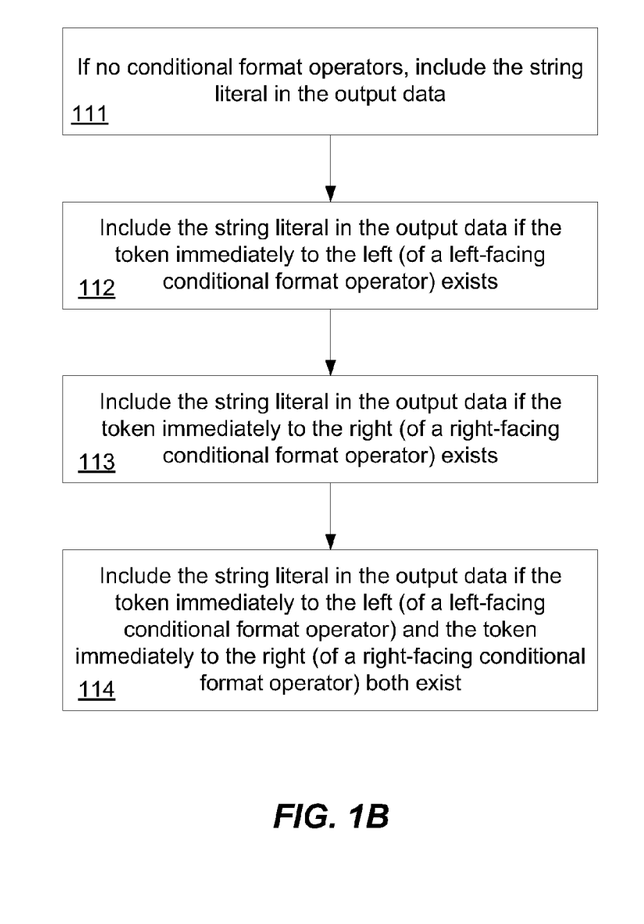
FIG. 1B illustrates a flow diagram showing an example of a process for conditionally including a token in output data according to one embodiment of the present invention.

FIG. 1B illustrates a flow diagram showing more details of box 104 of FIG. 1A according to one embodiment of the present invention. The method may be implemented as one or more computer programs that are executed on a hardware system (see FIG. 5 for more details). There may be cases when a user may want to include string literals if one or both of the tokens that surround the string literal exist in the parse. These cases may arise when a parsing rule may have optional components in the rule (i.e., using the "?" operator). To handle this, two conditional format operators may be used to indicate when a string literal may be included in the parse. The left-facing conditional format operator "<" (also referred to as the "<" operator) may indicate that the left side may be required. The right-facing conditional format operator ">" (also referred to as the ">" operator) may indicate that the right side may be required. Accordingly, the operators may generate four potential conditions. These may be handled as per the four processing operations shown in FIG. 1B (which may occur in any order).

At box 111, a string literal may be included in the output data. This condition may occur when the parsing rule does not include the "<" and ">" operators. For example, a formatting rule may be defined as the following: 1+"some string"+2. Since the "<" and ">" operators are not included in the formatting rule, the string literal of "some string" may be included in the output data.

At box 112, a string literal may be included in the output data if the token immediately to the left of the "<" operator (i.e., the left-facing conditional format operator) exists. For example, a formatting rule may be defined as the following: 1+<"some string"+2. Therefore, "some string" may be included in the output data if index 1 (i.e., the index to the token immediately to the left of the "<" operator) exists. If the parsing rule indicates that index 1 may be optional (i.e., using the "?" operator) and a particular tokenized data does not have a token assigned to index 1, "some string" may not be included in the output data.

At box 113, a string literal may be included in the output data if the token immediately to the right of the ">" operator (i.e., the right-facing conditional format operator) exists. For example, a formatting rule may be defined as the following: 1+"some string">+2. Thus, "some string" may be included in the output data if index 2 (i.e., the index to the token immediately to the right of the ">" operator) exists. If the parsing rule indicates that index 2 may be optional (i.e., using the "?" operator) and a particular tokenized data does not have a token assigned to index 2, "some string" may not be included in the output data.

At box 114, a string literal may be included in the output data if the token immediately to the left of the "<" operator and the token immediately to the right of the ">" operator both exists. For example, a formatting rule may be defined as the following: 1+<"some string">+2. Hence, "some string" may be included in the output data if index 1 (i.e., the index to the token immediately to left of the "<" operator) and index 2 (i.e., the index to the token immediately to the right of the ">" operator) both exist. If the parsing rule indicates that both index 1 and index 2 may be optional (i.e., using the "?" operator) and a particular tokenized data does not have a token assigned to index 1 and index 2, "some string" may not be included in the output data.

EXAMPLE IMPLEMENTATION

The following is a detailed explanation of an example implementation according to one embodiment of the present invention. The example implementation may be implemented as one or more computer programs that are executed on a hardware system (see FIG. 5 for more details). Furthermore, the example implementation may implement all or part of the method of FIG. 1A and method of FIG. 1B described above. In this example, it is assumed that the input data represents production information from several plants that process field crops, that each of the plants has a different way to record the processing information, and that a single representation for a master data warehouse is desired, which may be a format a custom analysis tool expects, for example. The input data contains a lot of different information, but it is assumed that where the crop was processed (PROCESSING_FACILITY), what kind of crop it is (PRODUCT), and the quality of processed crop (QUALITY) are the information of interest. For purposes of explanation, the example input data previously used above with the value of [LOC 334 75 BEANS G-VG] is used. This data represents that plant #334 in building 75 processed beans of a quality level 1 ("very good").

Figure 2A:
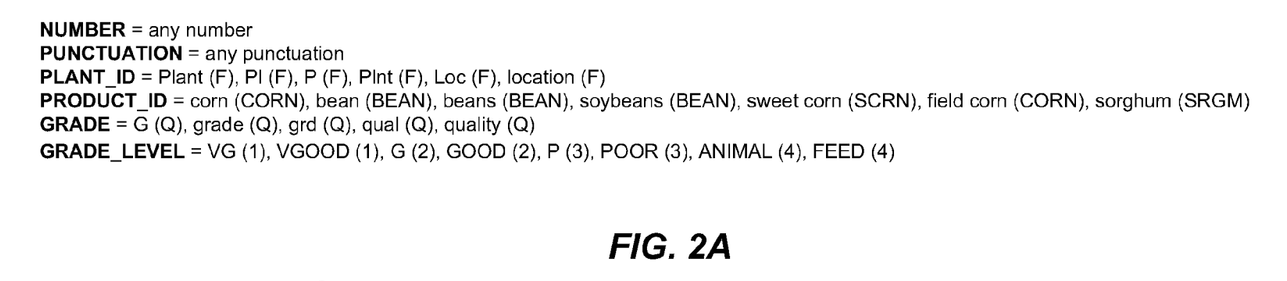
FIG. 2A illustrates example entries of a data dictionary according to one embodiment of the present invention.
Figure 2B:
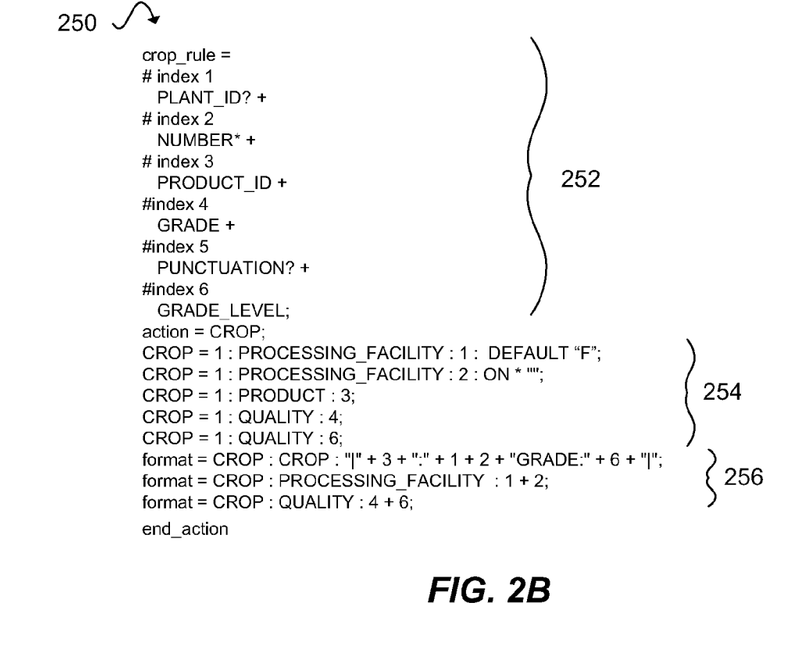
FIG. 2B illustrates an example parsing rule and formatting rule according one embodiment of the present invention.

The selected scheme that is used to tokenize the input data is to break on any whitespace or punctuation. The resulting tokens after the example input data has been tokenized is the following: [LOC], [334], [75], [BEANS], [G], [-], and [VG]. A selected parsing rule and a data dictionary may be applied to the tokenized input to determine whether a parse exists. A data dictionary may include entries that define the possible values for a particular classification, and what the possible values for the particular classification may represent. FIG. 2A illustrates example entries of a data dictionary according to one embodiment of the present invention. FIG. 2B illustrates an example 250 parsing rule and formatting rule according one embodiment of the present invention. For purposes of illustration, the data dictionary of FIG. 2A and the parsing rule 252 (i.e. "crop_rule") of FIG. 2B are applied to the example input data. The first index of the parsing rule 252 expects a PLANT_ID classification, which may be "Plant," "Pl," "P," "Plnt," "Loc," or "location" according to the data dictionary of FIG. 2A. Here, the first token matches the PLANT_ID classification because the first token is [LOC]. Since the first token matches the first index, the first index will have a value of "F" because the data dictionary indicates that a classification of PLANT_ID with a value of [LOC] represents "F." Note that the "?" operator is applied to the first index. Therefore, a parse may still occur even if the first token does not match the first index since the "?" operator indicates that the index is optional.

The second index of the parsing rule 252 expects a NUMBER classification with a "*" applied. Thus, according to the data dictionary, the second index expects one or more tokens that consist of any number. The next token is [334], which matches the second index. Similarly, the third token is [75], which also matches the second index. However, the fourth token is [BEANS], which does not match the second index. Therefore, the second index consists of the tokens [334] and [75].

The third index of the parsing rule 252 expects a PRODUCT_ID classification. The next token, [BEANS], matches the third index because [BEANS] is a value included in the PRODUCT_ID classification. Accordingly, [BEAN] is the value of the third index because [BEANS] represents [BEAN]. The fourth index of the parsing rule 252 expects a GRADE classification whose values may be "G," "grade," "grd," "qual," and "quality." The next token is [G], which represents "Q" in the data dictionary. Therefore, the fourth index has a value of "Q." The fifth index of the parsing rule 252 expects any optional PUNCTUATION because the "?" is applied to it. In this example, the next token is [-], a punctuation. Thus, the fifth index has a value of [-]. Finally, the sixth and final index of the parsing rule 252 expects a GRADE_LEVEL classification. The last token has a value of [VG], which represents the value "1" according to the data dictionary. Hence, the sixth index of the parsing rule 252 has a value of "1." Since the tokenized input data satisfies the parsing rule 252, this particular tokenized input data is a parse.

The action lines 254 indicate the information of interest in the input data. Withing the action lines 254, the following line illustrates the application of the [ON*] operator according to one embodiment of the present invention: "CROP=1: PROCESSING_FACILITY: 2: ON* " "." As discussed above, the "*" operator was applied to the second index. Therefore, to control what may delimit the one or more token matches, the [ON*] operator may be used. Here, an empty is used to delimit the one or more token matches associated with the second index. Since the token matches are [334] and [75] as described previously, the value of the second index is "33475" after applying the [ON*] operator.

Figure 3:
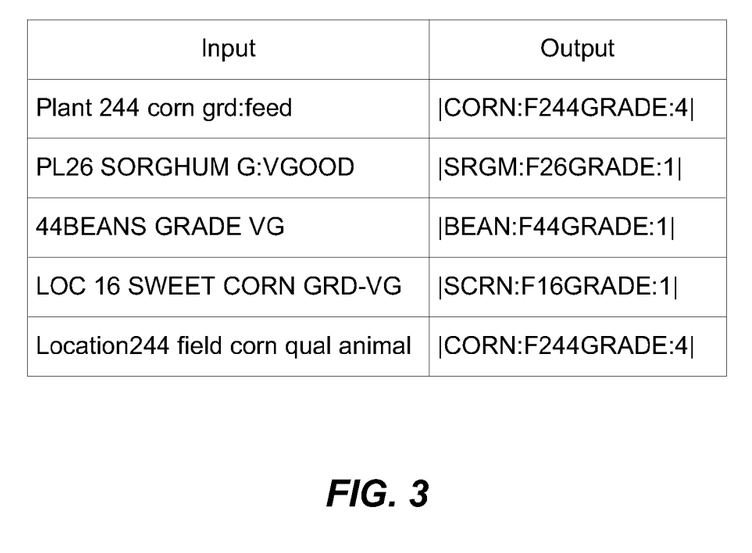
FIG. 3 illustrates a table of example input and output data according to one embodiment of the present invention.

The formatting rules 256 depicted in FIG. 2B (e.g., "format=") may define how matching token indexes are ordered, what string, if any, may be used to delimit the indexes, and which parts of the parse may be included in the output data. For example, the first of the formatting rules 256 in FIG. 2B is defined as follows: "format=CROP: CROP: "|"+3+":"+1+2+"GRADE:"+6+"|";". A formatting line may begin by specifying "format=". This indicates that a formatting rule may follow. In some embodiments, all formatting rules are the last lines in the action section of the rule. The "CROP" following the "format=" may indicate what is the top level category for this formatting rule. In other embodiments, like our example, "CROP" may match the action type of the rule. A top level category may be followed by a ":" to indicate the end of the identifier. Following a top level category may be a sub category for which the formatting rule may define. For a top level category formatting rule, what follows the top level category may be the same as the previous identifier, like in this example (i.e., "CROP" follows "CROP:"). Continuing with the example, the first formatting rule defines the top level category formatting to begin with a "|" string literal followed by the value of the third index followed by a ":" string literal, and so forth. This portion of the format lines tells Data Cleanse what the top level category for this format is. The resulting output for according to the example input data described above is [|BEAN:F33475GRADE:1|]. Likewise, FIG. 3 illustrates a table of example input and output data according to this example implementation.

The second of the formatting rules 256 defines a format for the PROCESSING_FACILITY sub category. Similarly, the third of the formatting rules 256 defines a format for the QUALITY category. In one embodiment, a formatting rule for a sub category may apply when the particular sub category is outputted and does not affect the building of the top level component. The sub category identifier may be followed by a ":" to indicate the end of the identifier.

Discrete Field Input

In one embodiment of the present invention, input data on discrete input fields may not be parsed by the parsing rules, and may function to standardize the input and produce a particular output field. Because there may not be a rule associated with a parse that results from discrete input fields, formatting information may be specified differently. In some embodiments, this may be implemented by adding a new section to a rule file. The section may control how output that may be generated from discrete input fields may be formatted, and how multiple tokens of input may be separated when the [ON*] may be used. Accordingly, formatting may be controlled by specifying the output sub category. The syntax may be similar to the formatting rules described above. In addition, string literals may function the same way (e.g., conditional inclusion of string literals as described above).

EXAMPLE IMPLEMENTATION

Figure 4:
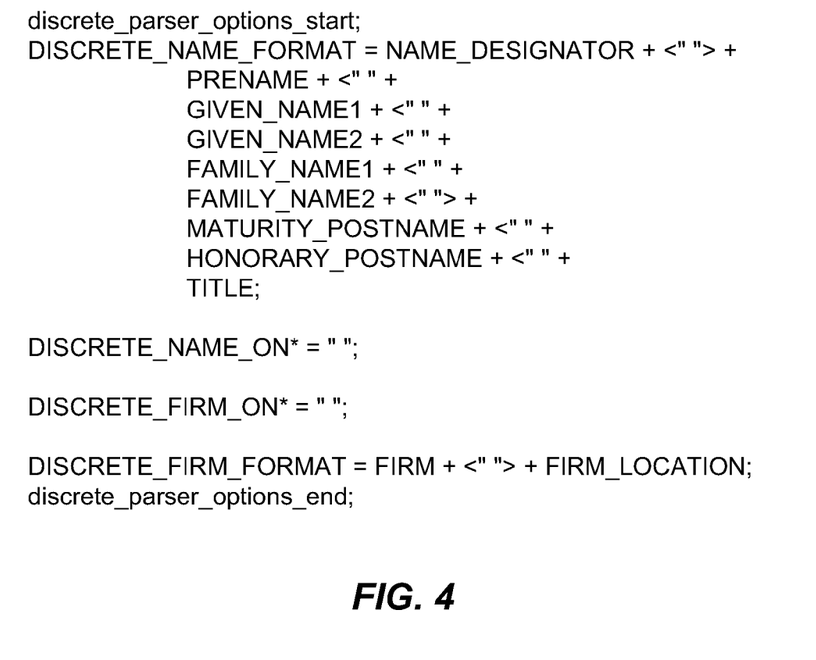
FIG. 4 illustrates an example of discrete field input formatting according to one embodiment of the present invention.

The following is an example implementation of discrete field input according to one embodiment of the present invention. FIG. 4 illustrates an example of discrete field input formatting according to one embodiment of the present invention. The example implementation may be a section within a rule file like the rule file depicted in FIG. 2B, for example. The "discrete_parser_options_start;" in the first line in FIG. 4 may be an identifier that may be used to indicate that the discrete input formatting options may follow. Similarly, the "discrete_parser_options_end;" in the last line may be an identifier that may be used to indicate that the discrete input formatting options may be finished. The "DISCRETE_NAME_FORMAT" may be an identifier that may indicate what the format should be for output generated from discrete name input fields. The output sub categories may be used to arrange the order of the NAME output created. The string literal syntax may be the same as the formatting rule as previously described. The "DISCRETE_NAME_ON*" may be an identifier that may indicate what, if any, string to use between multiple tokens that occur in the same discrete name input field. This may function similar to the [ON*] operator discussed above. Furthermore, the "DISCRETE_FIRM_ON*" may be an identifier that may indicate what, if any, string to use between multiple tokens that occur in the same discrete firm input field. The "DISCRETE_FIRM_FORMAT" may be an identifier that may indicate what the format should be for output generated from discrete firm input fields. The output sub categories may be used to arrange the order of the FIRM output created. The string literal syntax may be the same as the formatting rule as previously described.

Figure 5:
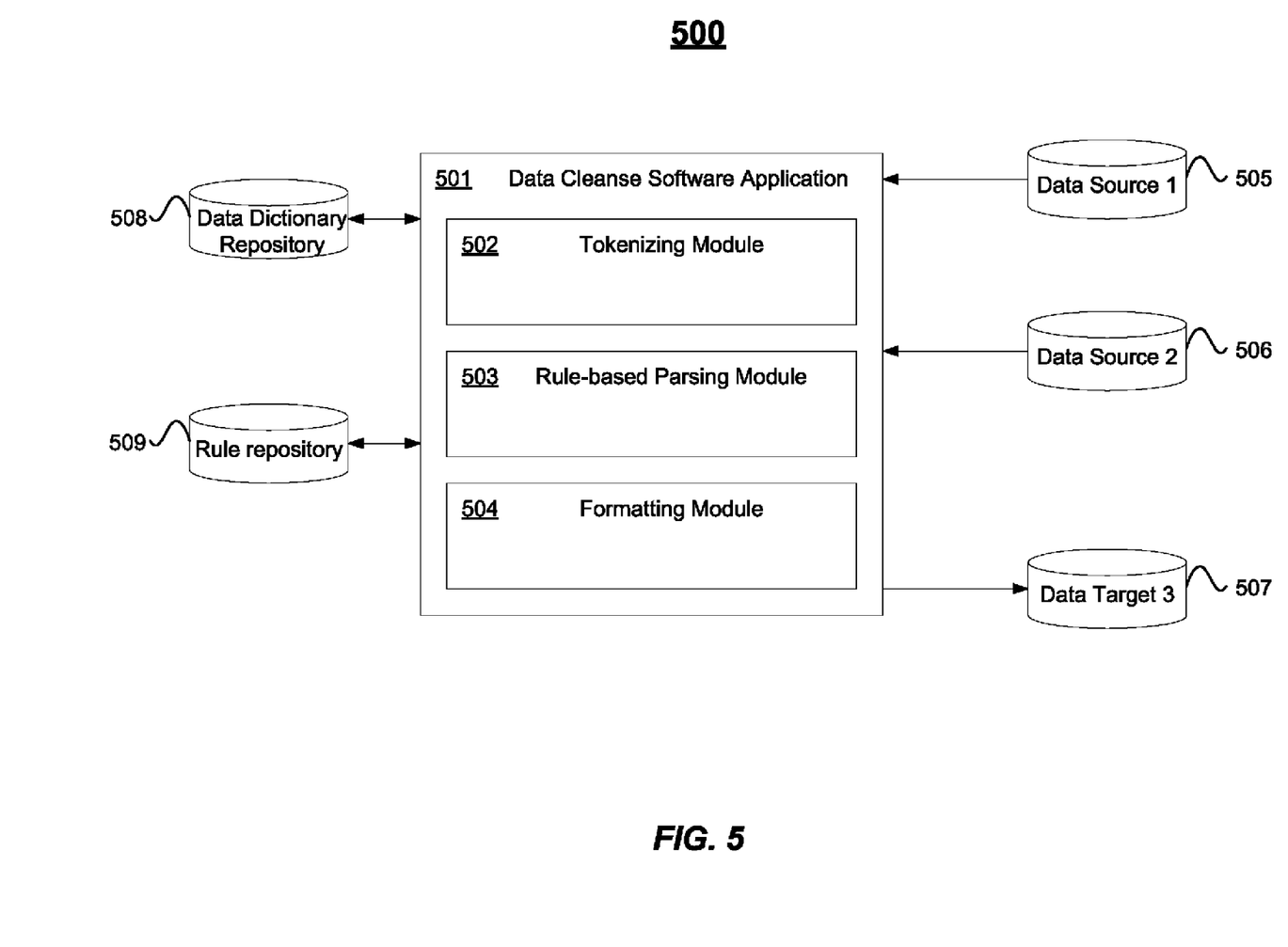
FIG. 5 is a block diagram that illustrates a system according to one embodiment of the present invention.

FIG. 5 is a block diagram that illustrates a system according to one embodiment of the present invention. System 500 may include data cleanse software application 501, data repository 505 (i.e., data source 1), data repository 506 (i.e., data source 2), data repository 507 (i.e., data target 3), data repository 508 (i.e., data dictionary repository), and data repository 509 (i.e., rule repository). Data cleanse software application 501 may obtain input data from data repositories 505 and 506, which may be processed by data cleanse software application. Accordingly, data repositories 505 and 506 may be configured to store input data, and may each comprise one or more databases, for example. Data cleanse software application 501 may transmit output data to data repository 507. Thus, data repository 507 may be configured to store output data, and may comprise one or more databases, for example. As an example, the data repository 507 may reside in the same physical database as one or more of the data repositories 505 and 506, as cleansed data.

In certain embodiments of the present invention, data cleanse software application 501 may include tokenizing module 502, rule-based parsing module 503, and formatting module 504. Tokenizing module 502 may be configured to tokenize data. For example, tokenizing module 502 may tokenize input data from data repositories 505 and 506. In some embodiments of the present invention, tokenizing module 502 may tokenize input data according to a data dictionary, which may be stored in data dictionary repository 508. In addition, rule-based parsing module 503 may be configured to parse input data. Rule-based parsing module 503 may parse input data that may have been tokenized by tokenizing module 502, for example. According to an embodiment, the content of one or more of the data repository 508 and the data repository 509 may reside in a working memory readily accessible to a processor (see FIG. 6). In one embodiment, the parsing rules used by rule-based parsing module 503 may be stored in rule repository 509. Formatting module 504 may be configured to format data and generate an output data. For example, formatting module 504 may format data that may have been tokenized by tokenizing module 502 and parsed by rule-based parsing module 503. In an embodiment of the present invention, the formatting rules used by formatting module 504 may be stored in rule repository 508. In some embodiments, data cleanse software application 501 may implement all or part of the method of FIG. 1A and the method of FIG. 1B. Tokenizing module 502 may implement all or part of box 101 of FIG. 1A, as described above. Rule-based parsing module 503 may implement all or part of box 102 of FIG. 1A. Additionally, formatting module 504 may implement all or part of boxes 103-105 of FIG. 1A and boxes 111-114 of FIG. 1B.

Figure 6:
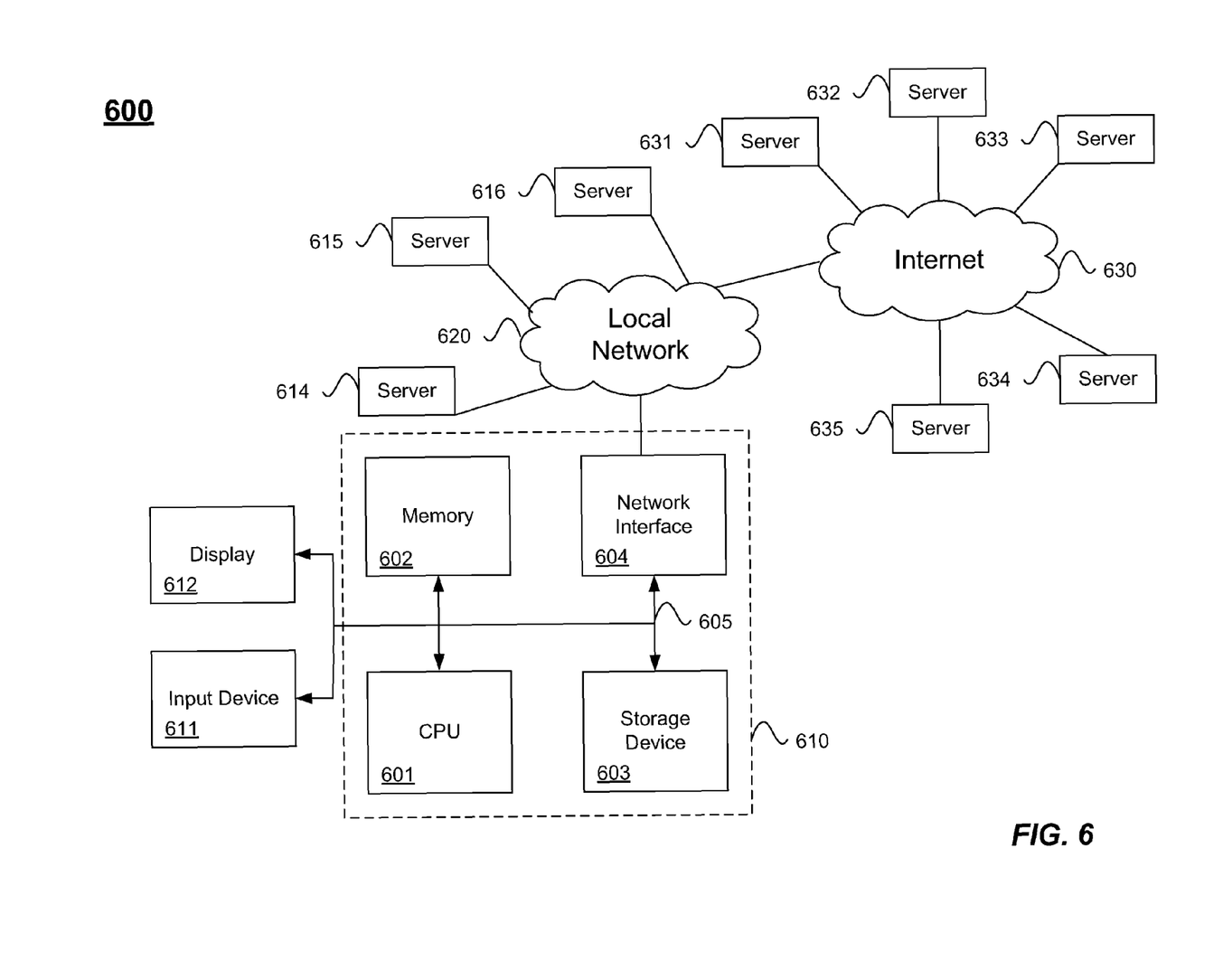
FIG. 6 is a block diagram of an example computer system and network for implementing embodiments of the present invention.

FIG. 6 is a block diagram of an example computer system and network 600 for implementing embodiments of the present invention. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above. This memory may also be used for storing variables or other intermediate information during execution of instructions to be executed by processors 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read (e.g., a "computer-readable medium"). Storage device 603 may include source code, binary code, or software files for performing the techniques or embodying the constructs above, for example.

Computer system 610 may be coupled via bus 605 to an output device, such as a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 604 sends and receives electrical, electromagnetic, or optical signals that carry digital data streams representing various types of information.

Computer system 610 can send and receive information, including messages or other interface actions, through the network interface 604 to an Intranet or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. Different processes may be implemented on any computer system and send and/or receive information across a network, for example. In one embodiment, the techniques describe above may be implemented by software services on one or more servers 631-635, for example. As an example, the data sources 505, 506 and 507, the data dictionary repository 508, and the rule repository 509 may be stored by one or more of the servers 631-635, for example in their respective memories (compare the memory 602) or storage devices (compare the storage device 603).

According to one embodiment, data cleanse software application 501 may be implemented by computer system 610. In some embodiments, tokenizing module 502, rule-based parsing module 503, and formatting module 504 may be implemented by processor 601, memory 602, and storage device 603. In other embodiments, data repository 505 may be implemented by server 614, data repository 506 may be implemented by server 615, and data repository 507 may be implemented by server 616.

According to another embodiment, all or part of the method of FIG. 1A may be implemented by computer system 610. The data sources of box 101 may be stored on one or more servers 614-616. The tokenizing of data of box 101 may be implemented by processor 601 and memory 602. The parsing in box 102 may be implemented by processor 601 and memory 602 where the parsing rule used for parsing may be stored in storage device 603. The data processing in box 104 and 105 may be implemented by processor 601 and memory 602 where the formatting rule used to process the data may be stored in storage device 603. According to an embodiment, all or part of the method of FIG. 1B may be implemented by processor 601 and memory 602. The memory 602 may implement the data dictionary repository 508 or the rule repository 509 (see FIG. 5).

According to an embodiment, agricultural information may be cleansed. Other types of data may also be cleansed. Name information may be cleansed. Address information may be cleansed. Non-English language information may be cleansed, for example, Japanese language information. Some languages may not use spaces (or other symbols) to delimit the components in information, such as for address and name information in Japanese; an embodiment of the present invention may be used to parse and standardize such information.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method for data cleansing using rule based formatting, comprising:

obtaining a first input data from a first data source and a second input data from a second data source, wherein said first input data is tokenized according to a data dictionary, wherein said second input data is tokenized according to said data dictionary;

parsing, by a rule-based parsing module implemented by a hardware server, said first input data and said second input data using a predefined parsing rule including an option operator, wherein the option operator indicates that a particular index defined in the predefined parsing rule is optional;

obtaining a formatting rule, wherein said formatting rule includes one or more formatting rule components including at least one conditional format operator, wherein the at least one conditional format operator indicates whether to include a particular string literal in an output data based on the existence of a particular token;

including a first token in a first output data if a first formatting rule component in the formatting rule is a first valid index to said first tokenized input data, wherein said first token is associated with said first valid index, and including a first string literal in said first output data if said first formatting rule component in the formatting rule is a string literal;

including a second token in a second output data if said first formatting rule component in the formatting rule is a second valid index to said second tokenized input data, wherein said second token is associated with said second valid index and including a second string literal in said second output data if said first formatting rule component in the formatting rule is the string literal;

formatting, by a formatting module implemented by the hardware server, said first output data and said second output data according to the formatting rule; and outputting said first output data and said second output data having been formatted.

2. The method of claim 1 further comprising storing, in a target data source, said first output data and said second output data having been outputted.

3. The method of claim 1 wherein said first string literal is included in said first output data if a token associated with a second formatting rule component to the immediate left of said first formatting rule component exists.

4. The method of claim 1 wherein said first string literal is included in said first output data if a token associated with a second formatting rule component to the immediate right of said first formatting rule component exists.

5. The method of claim 1 wherein a first token included in said first output data is associated with an index, wherein a second token included in said first output data is associated with the index.

6. The method of claim 5 wherein said first token included in said first output data and said second token included in said first output data are separated by a predetermined string.

7. A non-transitory computer-readable medium containing instructions for controlling a computer system to perform a method for data cleansing using rule based formatting, the method comprising:

obtaining a first input data and a second input data, wherein said first input data is tokenized according to a data dictionary, wherein said second input data is tokenized according to the data dictionary;

parsing said first input data and said second input data using a predefined parsing rule including an option operator, wherein the option operator indicates that a particular index defined in the predefined parsing rule is optional;

obtaining a formatting rule, wherein said formatting rule includes one or more formatting rule components including at least one conditional format operator, wherein the at least one conditional format operator indicates whether to include a particular string literal in an output data based on the existence of a particular token;

including a first token in a first output data if a first formatting rule component in the formatting rule is a first valid index to said first tokenized input data, wherein said first token is associated with said first valid index, and including a first string literal in said first output data if said first formatting rule component in the formatting rule is a string literal;

including a second token in a second output data if said first formatting rule component in the formatting rule is a second valid index to said second tokenized input data, wherein said second token is associated with said second valid index and including a second string literal in said second output data if said first formatting rule component in the formatting rule is the string literal; and formatting said first output data and said second output data according to the formatting rule.

8. The non-transitory computer-readable medium of claim 7 wherein the first tokenized input data is obtained from a first data source, and the second tokenized input data is obtained from a second data source.

9. The non-transitory computer-readable medium of claim 7 further comprising storing said first output data in a target data source, and storing said second output data in said target data source.

10. The non-transitory computer-readable medium of claim 7 wherein said first string literal is included in said first output data if a token associated with a second formatting rule component to the immediate left of said first formatting rule component exists.

11. The non-transitory computer-readable medium of claim 7 wherein said first string literal is included in said first output data if a token associated with a second formatting rule component to the immediate right of said first formatting rule component exists.

12. The non-transitory computer-readable medium of claim 7 wherein said first string literal is included in said first output data if a first token associated with a second formatting rule component to the immediate left of said first formatting rule component and a second token associated with a third formatting rule component to the immediate right of said first formatting rule component both exist.

13. The non-transitory computer-readable medium of claim 7 wherein a first token included in said first output data is associated with an index, wherein a second token included in said first output data is associated with the index.

14. The non-transitory computer-readable medium of claim 13 wherein said first token included in said first output data and said second token included in said first output data are separated by a predetermined string.

15. A system for data cleansing using rule based formatting, comprising:

a hardware server that implements the system;

a tokenizing module, implemented by the hardware server, that tokenizes a first input data according to a data dictionary, and tokenizes a second input data according to said data dictionary;

a rule-based parsing module, implemented by the hardware server, that parses said first input data and said second tokenized input data using a predefined parsing rule including an option operator, wherein the option operator indicates that a particular index defined in the predefined parsing rule is optional;

a formatting module, implemented by the hardware server, that receives the said first tokenized input data and said second tokenized input data, wherein a first token is included in a first output data if a first formatting rule component in a formatting rule is a first valid index to said first tokenized input data, wherein said first token is associated with said first valid index, wherein a first string literal is included in said first output data if said first formatting rule component in the formatting rule is a string literal, and wherein said formatting rule includes an immediate at least one conditional format operator, wherein the at least one conditional format operator indicates whether to include a particular string literal in an output data based on the existence of a particular token, wherein a second token is included in a second output data if said first formatting rule component in the formatting rule is a second valid index to said second tokenized input data, wherein said second token is associated with said second valid index, wherein a second string literal is included in said second output data if said first formatting rule component in the formatting rule is a string literal, and wherein said first output data and said second output data are formatted according to the formatting rule;

a first data source that stores said first input data;

a second data source that stores said second input data; and a third data source that stores said first output data and said second output data.

16. The system of claim 15 further comprising a rule repository that stores said formatting rule and said predefined parsing rule.

17. The system of claim 16, further comprising a memory that stores at least one of said formatting rule and said predefined parsing rule.

18. The system of claim 15 further comprising a data dictionary repository that stores said data dictionary.

19. A computer-implemented method for data cleansing using rule based formatting, comprising:

obtaining a first input data from a first data source and a second input data from a second data source, wherein said first input data is tokenized according to a data dictionary, wherein said second input data is tokenized according to said data dictionary;

parsing, by a rule-based parsing module implemented by a hardware server, said first input data and said second input data using a predefined parsing rule;

obtaining a formatting rule, wherein said formatting rule includes one or more formatting rule components;

including a first token in a first output data if a first formatting rule component in the formatting rule is a first valid index to said first tokenized input data, wherein said first token is associated with said first valid index, and including a first string literal in said first output data if said first formatting rule component in the formatting rule is a string literal;

including a second token in a second output data if said first formatting rule component in the formatting rule is a second valid index to said second tokenized input data, wherein said second token is associated with said second valid index and including a second string literal in said second output data if said first formatting rule component in the formatting rule is the string literal;

formatting, by a formatting module implemented by the hardware server, said first output data and said second output data according to the formatting rule; and outputting said first output data and said second output data having been formatted, wherein said first string literal is included in said first output data if a first token associated with a second formatting rule component to the immediate left of said first formatting rule component and a second token associated with a third formatting rule component to the immediate right of said first formatting rule component both exist, and wherein said second formatting rule component corresponds to a left-facing conditional format operator, and wherein said third formatting rule component corresponds to a right-facing conditional format operator.

* * * * *